United States Patent Office 3,825,516
Patented July 23, 1974

3,825,516
GLASS FIBER-REINFORCED, TEREPHTHALIC ACID-CONTAINING POLYAMIDE MOLDING COMPOUNDS
Johannes Schneider and Wolfgang Pungs, Troisdorf, Germany, assignors to Dynamit Nobel AG, Troisdorf, Germany
Filed Nov. 29, 1972, Ser. No. 310,493
Claims priority, application Germany, Dec. 14, 1971, P 21 61 908.9
Int. Cl. C08g 51/10
U.S. Cl. 260—37 N                10 Claims

ABSTRACT OF THE DISCLOSURE

A method for incorporating glass particles into an amorphous polyamide containing terephthalic acid radicals and a polymer selected from the group consisting of 2,2,4-trimethylhexamethylene diamine and 2,4,4-trimethylhexamethylene diamine which process comprises introducing said polyamide and said glass particles into a zone and kneading them together, preferably by employing a screw extruder such as a double screw extruder until the glass particles are intimately incorporated within and distributed throughout said polyamide.

BACKGROUND OF THE INVENTION

Field of the Invention

Figure 1:
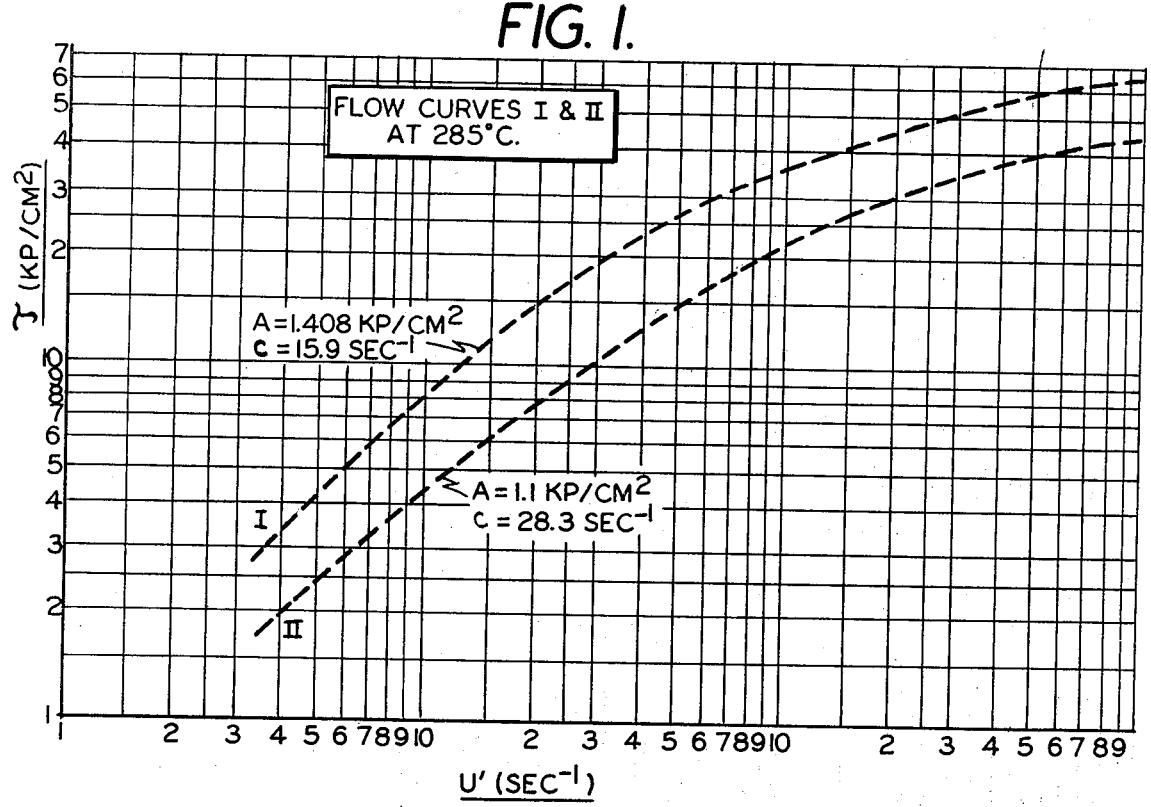
Figure 2:
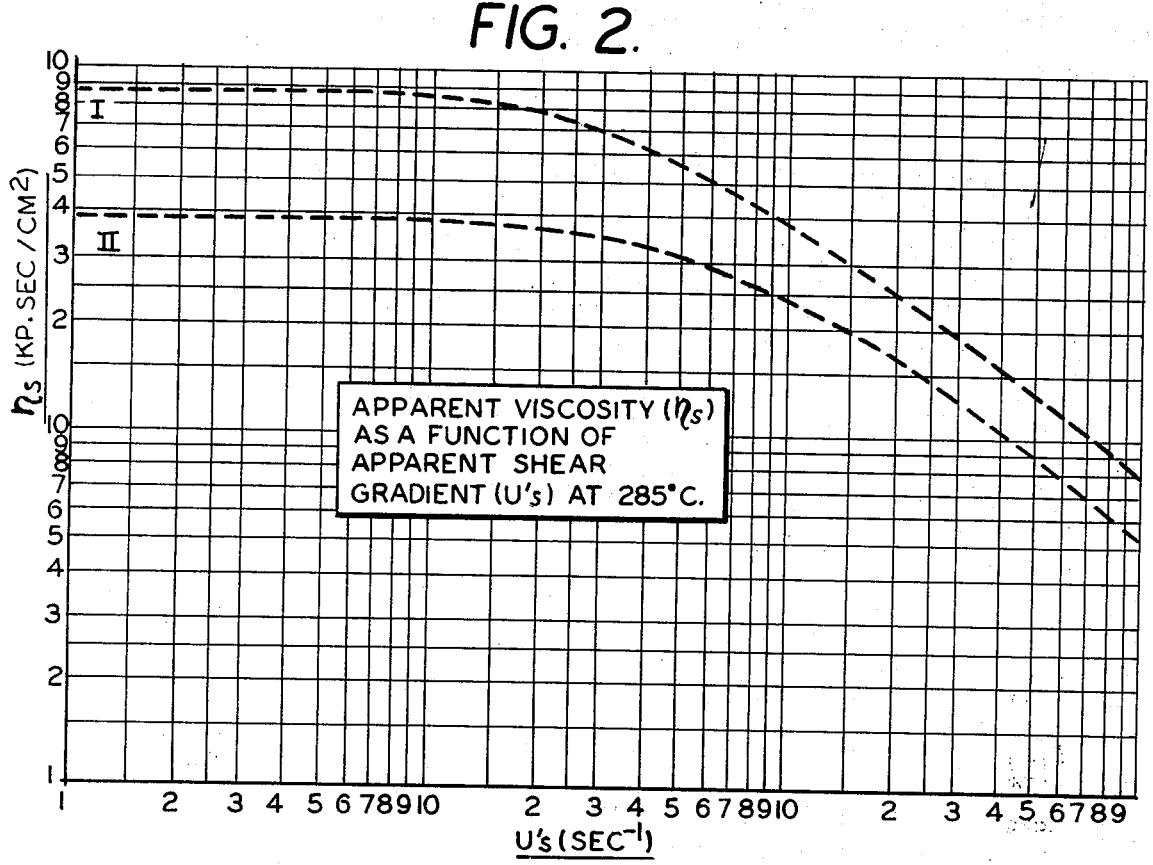

This invention is directed to a method of incorporating glass particles such as glass fibers into a polyamide prepared by condensing a terephthalic ester with a diamine component such as a 2,2,4- or a 2,4,4-trimethylhexamethylene diamine, or a mixture thereof, to render the same glass reinforced. The glass reinforced terephthalic acid-containing polyamide compositions of the present invention do not suffer by a reduction in essential property features.

DISCUSSION OF THE PRIOR ART

From the U.S. Pat. 3,150,117 it is known to make amorphous polyamides of terephthalic acid and mixtures of 2,2,4- and 2,4,4-trimethylhexamethylene diamine.

From the Belgian Pat. 756,343, it is also known to utilize the dimethyl esters of terephthalic acid in place of terephthalic acid. Molded articles of these polyamides, even relatively thick-walled molded articles, are transparent, they exhibit shape stability and high tensile strength.

These amorphous polyamides have gained industrial importance during the past years. As a result of their high strength, temperature stability and transparence, their high resistance to chemical action as well as their advantageous processing characteristics, it is obvious to utilize these polycondensates as fiber-reinforced thermoplastic materials.

It is known to improve the mechanical characteristics of thermoplastic plastics considerably by adding glass fibers. In particular the tensile strength, the blending strength as well as the thermal stability of the plastics are enhanced considerably.

Such glass fiber-reinforced thermoplastic plastics are therefore particularly suitable for making technical molded articles having high dimensional stability under temperature and moisture stresses.

Various methods are known to make such glass fiber-reinforced thermoplastic materials. For instance, continuous glass filament ropes, so-called rovings, can be covered while heated with a thermoplastic plastics material, if desired after a pretreatment with a sizing agent such as polyvinyl acetate or organosilicon compounds, according to the Belgian Pat. 619,768. Rovings are glass filament ropes, which consist of some spun filaments, which in turn are composed of approximately 200 to 300 elementary fibers of a diameter of between 2 and 12 microns.

According to another known process, short glass fibers are mixed with plastics granulate and the mixture is melted in a conventional extruder (British Pat. 618,094). In accordance with the German "Auslegeschrift" 1,454,- 789, it is also possible to proceed in such a way that the glass fibers are added to the melt of the thermoplastic material formed in the extruder. This method has advantages in the case of extruders, in which it is possible to introduce the glass fiber material into the melt through a suitable opening, for instance through one of the customary degasification pipes, at a point of the screw, at which the plastics melt is not maintained under pressure. In this manner thermoplastic materials of low melt viscosity, such as e.g. crystalline polyamides of adipic acid and hexamethylene diamine or of ε-aminocaproic acid as well as polycarbonates, can be advantageously made into glass fiber-containing granulate, which can be readily worked into molded articles with uniform strength characteristics on injection molding machines.

Unlike the well-known crystalline polyamides such as those of adipic acid and hexamethylene diamine or poly-ε caproamide, amorphous polyamides of terephthalic acid and 2,2,4-trimethylhexamethylene diamine or 2,4,4-trimethylhexamethylene diamine or mixtures of the diamine components are not readily reinforced with glass particles such as glass fibers. It has been found that these polyamides are quite unusual and unlike the more popular and well-known amides. For instance, they have unusual properties with respect to elongation. They can be formed into films by techniques wherein they are subjected to extensive elongation. Similarly, they can be formed into deep drawn (thermoformed) packages wherein a film is subjected to an extensive drawing downwardly in a mold. Therefore, the processing techniques applicable for the processing of nylon 6 or nylon 6/6 does not follow for these amorphous polyamides which possess unusual properties, not typical of polyamides generally. Specifically, it has become desirable to provide a means whereby the amorphous polyamides of terephthalic acid and 2,2,4- or 2,4,4-trimethylhexamethylene diamine can be reinforced with glass particles such as glass fibers. The amorphous polyamides which can be formed into molding compositions and which are made up from these precursors generally have a viscosity number in the range of 92 to 166, as determined in accordance with DIN 53 727 employing a 0.5% by weight solution of polymer in meta-cresol at a temperature of 25° C. These polymers can be prepared in accordance with the teachings of U.S. 3,150,117 and can be worked at temperatures 250 and 320° C. Unfortunately, they give rise to considerable difficulties when it desired to incorporate glass particles therein.

Thus, it was found that granulates having a glass fiber content of as little as 20% cannot be readily prepared without difficulty by known techniques, i.e. the strands discharged from the extruder tend to tear off right after leaving the hole of the nozzle so that it is not possible to make granulate without defects. A granulate prepared in this manner exhibits extremely poor processing characteristics, and standard test rods made therefrom do not show any improved properties, but, more significantly, a reduction in essential property features, all as will be seen from the discussion below, particularly Table 1.

SUMMARY OF THE INVENTION

There has now been provided a method for incorporating a glass particle into an amorphous polyamide of terephthalic acid ester and 2,2,4- or 2,4,4-trimethylhexamethylene diamine which comprises introducing said polyamide and glass particles into a zone and subjecting them to a kneading action until said glass particles are intimately incorporated within and distributed throughout said polyamide.

In accordance with the particular desirable embodiment of the present invention, the kneading operation is carried out in a zone maintained under a reduced pressure which zone contains a screw mechanism which revolves within the mass of polyamide-glass particles to impart the kneading operation. More particularly, the method of the present invention is carried out employing, preferably, a double screw extruder operating within a zone in which a reduced atmosphere is maintained. Thus it has been found that when these polyamides are intimately mixed with the glass particles, the glass particles can be kneaded into the polyamide material to provide a material which is glass reinforced and which is not lacking in essential properties.

In accordance with this invention, polyamides can be reinforced with glass particles wherein the end product is characterized by between 10 and 45 weight percent glass, preferably between 25 and 35 weight percent glass. The amount of glass can be supplied by any of a number of different sources of glass, namely, glass powder, glass particles, glass fibers, glass rovings, and the like. Indeed, numerous different types of glass can be used.

As indicated above, a preferred method of incorporating the glass particles into the amorphous polyamides involves the use of a screw extruder, particularly the type in which vent orifices are provided whereby volatile materials can be withdrawn. The screw extruder can be operated at a reduced pressure within the extrusion zone such as a pressure between 150 and 450 Torr, preferably between 180 and 250 Torr.

Suitably, the kneading operation is performed by use of a screw element operating at a horse power between 30 kw. and 60 kw., preferably between 39 kw. and 53 kw. This can be provided employing a screw which revolves at a rate of between 80 and 120 r.p.m. Desirably, the kneading operation is carried out employing two generally parallel arranged screws.

It must be realized that it is through the specific action of the screw extruder, and particularly through the action of the double extruder, that the glass particles are intimately incorporated within the matrix of the amorphous polyamide. The extruder can then move the homogeneous mass through the die of the extrusion zone to form the same into a strand which can later be broken up by comminution.

Thus, the object of the present invention is solved by this process which makes available a glass fiber reinforced molding compound which can have a glass fiber content of at least 35% by weight, the polymer consisting of an amorphous polyamide containing terephthalic acid radicals and 2,2,4- and/or 2,4,4-trimethylhexamethylene diamine radicals, the mass being suitable to be worked into granulates on conventional extruders.

The reinforced polyamide of the present invention is useful in the manufacture of molded articles which have high dimensional stability and increased thermostability (according to Martens), on plunger and screw injection molding machines. Indeed, the method of the present invention imparts to these polymers increased dimensional stability and thermostability. The kneading operation can suitably take place at a temperature betwen 250 and 330° C., but preferably at a temperature within the range of 270 and 310° C. According to the invention, glass particles can be incorporated into the amorphous polyamide in an amount between 10 and 45% by weight, preferably within the range of 20 and 35% by weight. Naturally, the size and shape of the glass fibers will, to some extent, have a bearing upon the amount of glass which can be incorporated within the amorphous polyamide.

The polyamides which are utilized in the present invention are those made from a terephthalic acid precursor and a diamine component which is either 2,2,4- or 2,4,4-trimethylhexamethylene diamine, or a mixture thereof, which polyamide has a viscosity number as determined in accordance with DIN 53727 employing a 0.5 weight percent solution in m-cresol at 25° C., within the range of 116 and 150, preferably between 120 to 142. These polyamides of terephthalic acid dimethyl ester and mixtures of 2,2,4- and 2,4,4-trimethylhexamethylene diamine that are particularly suitable for being reinforced with glass fibers, are made in such a way that the diamine mixture and the dimethyl ester of terephthalic acid are precondensed in the presence of water and the subsequent polycondensation is carried out only to a viscosity range of 50 to 90, preferably 70 to 80, and the product obtained is passed via a hopper, in which the compound is under the pressure of an inert gas at 200–300° C., preferably approximately 250° C., into a vacuum double screw extruder, in which the condensation is continued to a final viscosity of 116 to 150. The distinct rheological characteristics of a polyamide of terephthalic acid dimethyl ester and a polyamide of terephthalic acid are evident from the diagrams A and B.

BRIEF DESCRIPTION OF DIAGRAMS

Referring to the diagrams, diagrams A and B are graphical representations of the true flow diagrams (Diagram A) and the apparent viscosity (Diagram B) as a function of the apparent shear gradient. The measurements were carried out in the extrusion viscosimeter that works on the capillary principle at 285° C. Circular hole nozzles having diameters between 3 to 6.7 mm. were utilized, a shear gradient range of approximately 5 to 600 $s^{-1}$ being covered.

Curve I: Polyamide of terephthalic acid and the isomer mixture of 1,6-diamino-2,2,4-trimethylhexane and 1,6-diamino-2,4,4-trimethylhexane
  Solution Viscosity: viscosity number=100
  Method of Preparation: U.S. Pat. 3,150,117

Curve II: Polyamide of dimethyl ester of terephthalic acid and the isomer mixture of 1,6-diamino-2,2,4-trimethylhexane and 1,6-diamino-2,4,4-trimethylhexane
  Solution viscosity: viscosity number=136
  Method of Preparation: Belgian Patent 756,343.

DESCRIPTION OF SPECIFIC EMBODIMENTS

When such terephthalic acid polyamides of the dimethyl ester of terephthalic acid and the aforementioned isomer mixture in the viscosity number range of 116 to 150, preferably 120 to 142, are used to make glass fiber-reinforced plastics granulate, one can without difficulty incorporate 35% by weight of glass fibers, which can be sized, by means of double screw extruders. The glass-fiber-containing strands discharged from the hole nozzle system are uniform and do not tear off prior to the subsequent granulating operation, thus warranting a trouble-free continuous production. In this manner, amorphous polyamides are made into plastics granulate in which the fibers, which have an average length of 1 to 3 mm., are largely undamaged and are distributed in a completely disorderly but uniform manner.

There are no glass fiber accumulations in the nozzle of injection molding machines when processing the glass fiber-containing granulate prepared in accordance with the invention. In this manner injection molded articles are obtained of amorphous polyamides, in which the glass fibers are distributed completely uniformly. For this reason, the injection molded articles made from the granulate prepared in accordance with the invention exhibit very good and above all uniform strength characteristics.

The result is surprising, i.e. that an amorphous polyamide of terephthalic acid dimethyl ester and the aforementioned diamine mixture with high solution viscosity is particularly well suited for the production of glass fiber-reinforced molding compounds. It could not be anticipated that an amorphous polyamide having a considerably higher solution viscosity would have substantially better flow and processing characteristics in the production and processing of glass fiber-containing molding compounds than an amorphous polyamide having a lower solution viscosity.

Another advantage of the process in accordance with the invention consist in that it is possible to incorporate glass beads having grain sizes of 5μ–30μ up to 35% by weight. It is also possible to incorporate without difficulties color pigments to attain special color hues and flame-inhibiting additives such as e.g. pentabromodiphenyl ether and antimony trioxide as well as anti-adhesion agents on the basis of lactones in a suitable concentration.

The amorphous polyamides of dimethyl ester of terephthalic acid and 2,2,4/2,4,4-trimethylhexamethylene diamine are advantageously compounded with glass fibers and/or glass powders in a double screw extruder, in which the screw length should appropiately be 15 D.

The thermoplastic amorphous polyamide can be supplied to the extruder in a suitable form, e.g. as granulate or powder. In order to avoid damaging the plastics compound by oxidation, the plastics material can be fed in an inert gas atmosphere, e.g. nitrogen. In that case, it is advantageous to use an extruder which is equipped with one of the customary degasification pipes.

The quantity of reinforcing material to be added to the thermoplastic amorphous polyamide depends on the desired properties of the molded article to be made. If desired, the glass fiber materials to be utilized may be treated with one of the customary sizing agents.

In order to more fully illustrate the nature of the invention in the manner of practising the same, the following Examples are presented.

Example 1

In a commercially available mixer 70% by weight of a cylindric granulate of an amorphous polyamide consisting of the dimethyl ester of terephthalic acid and a 2,2,4/2,4,4-trimethylhexamethylene diamine mixture and having an average bulk density of 640/g./ltr. and a viscosity number of 136, determined in accordance with DIN 53727, measured in a 0.5% solution in m-cresol, are mixed at 25° C. with 30% by weight of glass fibers of a length of 3 mm. This mixture is compounded in the melt by means of a double screw extruder (Alphine DL 60). The processing temperatures in the various zones were as follows: Zone 1: +265° C.; Zone 2: +280° C.; Zone 3: +290° C.; Zone 4: +275° C. Tool temperature: +265° C. The number of revolutions of the screw was 25 r.p.m. at a drive power of 20 amperes. The glass fiber-containing strands discharged from the nozzle are drawn off horizontally while being cooled by air and are cut to a cylindrical granulate in the chopping granulator. The granulate obtained exhibits a disorderly distribution of the glass fibers. Injection molded articles made from this granulate by means of a plunger injection molding machine (EL VII) show a completely uniform distribution of the glass fibers and a smooth surface.

The granulate obtained was made into standard test specimens which were used to determine the following properties:

| | DIN | Dimension | Properties |
|---|---|---|---|
| Density | 53,479 | G./cm.$^3$ | 1.27 |
| Tearing strength | 53,455 | Kp./cm.$^2$ | 1,200 |
| Maximum (Limiting?) bending stress | 53,452 | Kp./cm.$^2$ | 1,700 |
| Impact strength | 53,453 | Cm.kp./cm.$^2$ | 39 |
| Notched-bar impact strength | 53,453 | Cm.kp./cm.$^2$ | 8 |
| Dimensional stability (acc. to Martens) | 53,458 | ° C. | 130 |
| Post-shrinkage, 8 hrs., +120° C | | Percent | 0.06 |

Example 2

As set forth in Example 1, glass fibers of 3 mm. length and the polyamide of dimethylterephthalate and a 2,2,4/2,4,4-trimethylhexamethylene diamine mixture of a solution viscosity of 140 are used to make a mixture consisting of 35% by weight of glass fibers and 65% by weight of the amorphous polyamide and are compounded in accordance with Example 1 at a screw speed of 20 r.p.m. and a driving power of 20 amperes.

The processing temperatures of the zones were as follows: Zone 1: +265° C.; Zone 2: +280° C., Zone 3: +290° C.; Zone 4: +275° C. Temperature of the nozzle tool: 265° C.

The glass fiber-containing strands discharged from the nozzle are drawn off horizontally while being cooled by air and are cut into a cylindrical granulate by means of a strand granulator.

Standard test specimens made from this granulate in a plunger injection molding machine exhibited the following characteristics:

| | DIN | Dimension | Properties |
|---|---|---|---|
| Density | 53,479 | G./cm.$^3$ | 1.38 |
| Tearing strength | 53,455 | Kp./cm.$^2$ | 1,400 |
| Maximum bending stress | 53,452 | Kp./cm.$^2$ | 1,920 |
| Impact strength | 53,453 | Cm.kp./cm.$^2$ | 31 |
| Notched-bar impact strength | 53,453 | Cm.kp./cm.$^2$ | 8 |
| Dimensional stability (acc. to Martens) | 53,458 | ° C. | 141 |
| Post-shrinkage, 8 hrs., 120° C | | Percent | 0.07 |

Example 3

As specified in Example 1, 30% by weight of glass beads, which have a diameter ranging between 5μ and 50μ, are mixed with 70% by weight of the amorphous polyamide having a solution viscosity of 142 and are compounded in accordance with Example 1 at a screw speed of 20 r.p.m. and a current consumption of 20 amperes at the following temperatures: Zone 1: +255° C.; Zone 2: +275° C.; Zone 3: +280° C.; Zone 4: +280° C. Temperature of the nozzle tool: +265° C.

The strands discharged from the nozzle were drawn off horizontally while being cooled by air and were cut into granulate by means of a strand granulator. The standard test specimens made from this granulate by means of a plunger injection molding machine had the following properties:

| | DIN | Dimension | Properties |
|---|---|---|---|
| Density | 53,479 | G./cm.$^3$ | 1.13 |
| Tearing strength | 53,455 | Kp./cm.$^2$ | 805 |
| Maximum bending stress | 53,452 | Kp./cm.$^2$ | 1,150 |
| Impact strength | 53,453 | Cm.kp./cm.$^2$ | 52 |
| Notched-bar impact strength | 53,453 | Cm. kp./cm.$^2$ | 8 |
| Dimensional stability (acc. to Martens) | 53,458 | ° C. | 108 |
| Post-shrinkage, 8 hrs., +120° C | | Percent | 0.08 |

Example 4

Procedure was as set forth in Example 1 following addition of 1% by weight of α-butyrolactone based on the total mixture, and the mixture was compounded in accordance with Example 1 at a screw speed of 35 r.p.m.

and a driving power of 20 amperes. The processing temperatures of the zones were as follows: Zone 1: +265° C.; Zone 2: +280° C.; Zone 3: +290° C.; Zone 4: +275° C. Temperature of the nozzle tool: +265° C. The granulate obtained was made into standard test specimens as usual, and the following properties were determined:

|  | DIN | Dimension | Properties |
|---|---|---|---|
| Density | 53,479 | G./cm.$^3$ | 1.28 |
| Tearing strength | 53,455 | Kp./cm.$^2$ | 1,300 |
| Maximum bending stress | 53,452 | Kp./cm.$^2$ | 1,780 |
| Impact strength | 53,453 | Cm.kp./cm.$^2$ | 45 |
| Notched-bar impact strength | 53,453 | Cm.kp./cm.$^2$ | 7 |
| Dimensional stability (acc. to Martens) | 53,458 | ° C. | 126 |
| Post-shrinkage, 8 hrs. +120° C | | Percent | 0.09 |

Example 5

As set forth in Example 1, an amorphous polyamide of dimethylterephthalate and a 2,2,4/2,4,4-trimethylhexamethylene diamine mixture with a viscosity number of 120 is mixed with 50% by weight of a sized glass fiber of a length of 3 mm. and subsequently the mixture is compounded by means of a double screw extruder and further processed as specified; the glass fiber-containing strand and the cut granulate exhibit a very rough surface. This effect cannot be overcome by another granulation. Standard test specimens made from this granulate by means of a plunger injection molding machine show the following properties:

|  | DIN | Dimension | Properties |
|---|---|---|---|
| Density | 53,479 | G./cm.$^3$ | 1.50 |
| Tearing strength | 53,455 | Kp./cm.$^2$ | 1,750 |
| Maximum bending stress | 53,452 | Kp./cm.$^2$ | 2,200 |
| Impact strength | 53,453 | Cm.kp./cm.$^2$ | 29 |
| Notched-bar impact strength | 53,453 | Cm.kp./cm.$^2$ | 8 |
| Dimensional stability (acc. to Martens) | 53,458 | ° C. | 137-144 |
| Post-shrinkage, 8 hrs., +120° C | | Percent | 0.09 |

Example 6

79% by weight of the amorphous polyamide of dimethylterephthalate and the diamine mixture having a viscosity number of 130 were intimately mixed with 1% by weight of α-butyrolactone and subsequently compounded with 20% by weight of a glass fiber of 6 mm. length in the double screw extruder in accordance with Example 1. The glass fiber-containing strands discharged from the nozzle were drawn off horizontally while being cooled with air and processed into granulate by means of a strand granulator. Standard test specimens with a smooth surface could be made of this granulate, and the following properties were determined:

|  | DIN | Dimension | Properties |
|---|---|---|---|
| Density | 53,479 | G./cm.$^3$ | 1.27 |
| Tearing strength | 53,455 | Kp./cm.$^2$ | 1,200 |
| Maximum bending stress | 53,452 | Kp./cm.$^2$ | 1,840 |
| Impact strength | 53,453 | Cm.kp./cm.$^2$ | 28 |
| Notched-bar impact strength | 53,453 | Cm.kp./cm.$^2$ | 7 |
| Dimensional stability (acc. to Martens) | 53,458 | ° C. | 125 |
| Post-shrinkage, 8 hr., +120° C | | Percent | 0.09 |

TABLE 1.—PROPERTIES OF A REINFORCED POLYAMIDE COMPARED TO THE THERMOPLASTIC BASIS COMPONENT [1]

|  | DIN | Dimension | Nonreinforced | 20% glass fiber content |
|---|---|---|---|---|
| Density | 53 479 | G./cm.$^3$ | 1.12 | 1.27 |
| Maximum bending stress | 53 452 | Kp./cm.$^2$ | 1,250 | 925 |
| Impact strength | 53 453 | Cm.kp./cm.$^2$ | ([2]) | 27 |
| Notched-bar impact strength | 53 453 | Cm.kp./cm.$^2$ | 10 | 4 |
| Tearing strength | 53 455 | Kp./cm.$^2$ | 650 | 635 |
| Dimensional stability acc. to Martens | 53 458 | ° C. | 100 | 105 |

[1] Thermoplastic basis component=the amorphous polyamide of terephthalic acid and 2,2,4- and/or 2,4,4-trimethylhexamethylene diamine.
[2] Without rupture.

TABLE 2.—PROPERTIES OF REINFORCED COMPOUNDS WITH 35% BY WT. OF GLASS FIBERS OF A LENGTH OF 1 TO 3 MM.

Compound consisting of:
T=polyamide of terephthalic acid and 2,2,4/2,4,4-trimethylhexamethylene diamine.
B=polyamide on the basis of poly-ε-caprolactam.

|  | DIN | Dimension | 35% glass fibers, 45% T, 20% B | 35% glass fibers, 25% T, 40% B |
|---|---|---|---|---|
| Density | 53 479 | G./cm.$^3$ | 1.43 | 1.35 |
| Maximum bending stress | 53 452 | Kp./cm.$^2$ | 2,140 | 2,170 |
| Modulus of elasticity (tensile stress) | 53 457 | Kp./cm.$^2$ | 108,600 | 103,500 |
| Impact strength | 53 453 | Cm.kp./cm.$^2$ | 34 | 42 |
| Notched-bar impact strength | 53 453 | Cm.kp./cm.$^2$ | 8 | 11 |
| Tearing strength | 53 455 | Kp./cm.$^2$ | 1,700 | 1,700 |
| Dimensional stability acc. to Martens | 53 458 | ° C. | 96 | 68 |
| Post-shrinkage, 8 hrs., +120° C. | | Percent | 0.24 | 0.26 |

What is claimed is:

1. A method of incorporating a glass particle into an amorphous polymer of a polyamide produced by reacting a terephthalic acid dimethyl ester *residue* derived from terephthalic acid ester and a diamine component selected from the group consisting of 2,2,4-trimethylhexamethylene diamine and 2,4,4-trimethylhexamethylene diamine which polyamide has a viscosity number ranging from 116 to 150, said viscosity number determined in a 0.5% solution in m-cresol according to DIN 53727 which comprises introducing said polyamide acid and said glass particle into a zone and subjecting the mixture to a kneading action in a screw extruder which screw extruder is a double screw extruder maintained at a pressure between 150 and 450 torr.

2. A method according to Claim 1 wherein each screw of the double screw extruder is revolved at a rate of between 20 and 120 r.p.m.

3. A method according to Claim 2 wherein the mixture is worked at a temperature between 250 and 330° C.

4. A method according to Claim 3 wherein the polymer comprises a mixture of units of 2,2,4-trimethylhexamethylene diamine and 2,4,4-trimethylhexamethylene diamine and the polymer has a viscosity number according to DIN 53727 determined in a 0.5% solution in m-cresol at 25° C between 120 and 142.

5. A method according to Claim 1 wherein the glass particles have a grain size between $5\mu$ and $50\mu$.

6. A method according to Claim 5 wherein between 10 and 45% by weight glass is incorporated into the polyamide.

7. A method according to Claim 6 wherein each screw of the screw extruder is operated at a horse power between 30 kw. and 60 kw.

8. A composite article comprising a polyamide produced by reacting a terephthalic acid dimethyl ester and a diamine component selected from the group consisting of 2,2,4-trimethylhexamethylene diamine and 2,4,4-trimethylhexamethylene diamine and a glass particle said article having a glass content of between 10 and 45% by weight, said polyamide having a viscosity number ranging from 116 to 150, said viscosity number determined in a 0.5% solution in m-cresol according to DIN 53727.

9. A method according to Claim 4 wherein the glass particle is in the form of a fiber.

10. A composite according to Claim 8 when the glass particle is in the form of a fiber.

References Cited

UNITED STATES PATENTS

| 3,164,563 | 1/1965 | Maxwell | 260—37 |
| 3,661,837 | 4/1972 | Cadus | 260—37 N |
| 3,150,117 | 9/1964 | Gabler | 260—78 |
| 3,554,966 | 1/1971 | Jones | 260—47 |

ALLAN LIEBERMAN, Primary Examiner

R. ZAITLEN, Assistant Examiner

UNITED STATES PATENT OFFICE
CERTIFICATE OF CORRECTION

Patent No. 3,825,516  Dated July 23, 1974

Inventor(s) Johannes Schneider and Wolfgang Pungs

It is certified that error appears in the above-identified patent and that said Letters Patent are hereby corrected as shown below:

Column 1, line 59

"blending" should be "bending"

Column 5, line 37

"appropriately" is misspelled

Column 8, lines 22-23

"residue derived from terephthalic acid ester" should be deleted.

Column 8, line 29 delete "acid".

Signed and sealed this 29th day of October 1974.

(SEAL)
Attest:

McCOY M. GIBSON JR.
Attesting Officer

C. MARSHALL DANN
Commissioner of Patents